March 4, 1969     H. EDWARDS ET AL     3,431,081
APPARATUS FOR METERING AND MIXING POLYURETHANE COMPONENTS
Filed Nov. 1, 1963
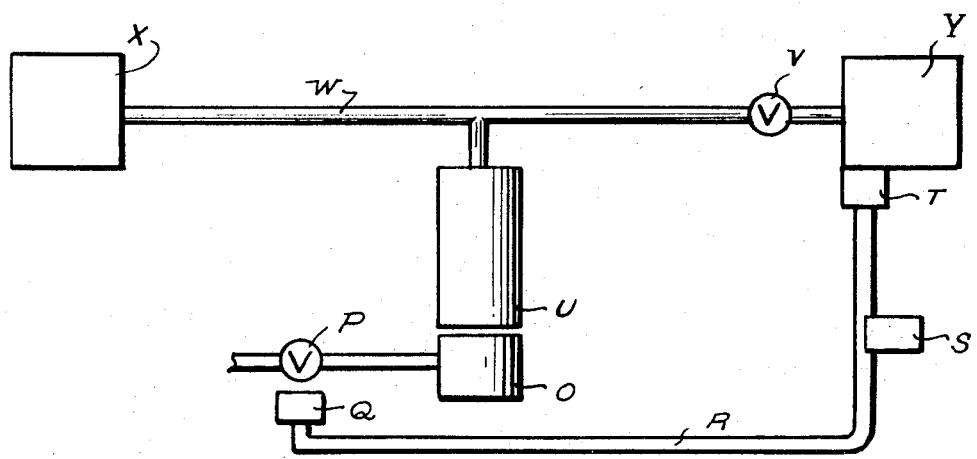
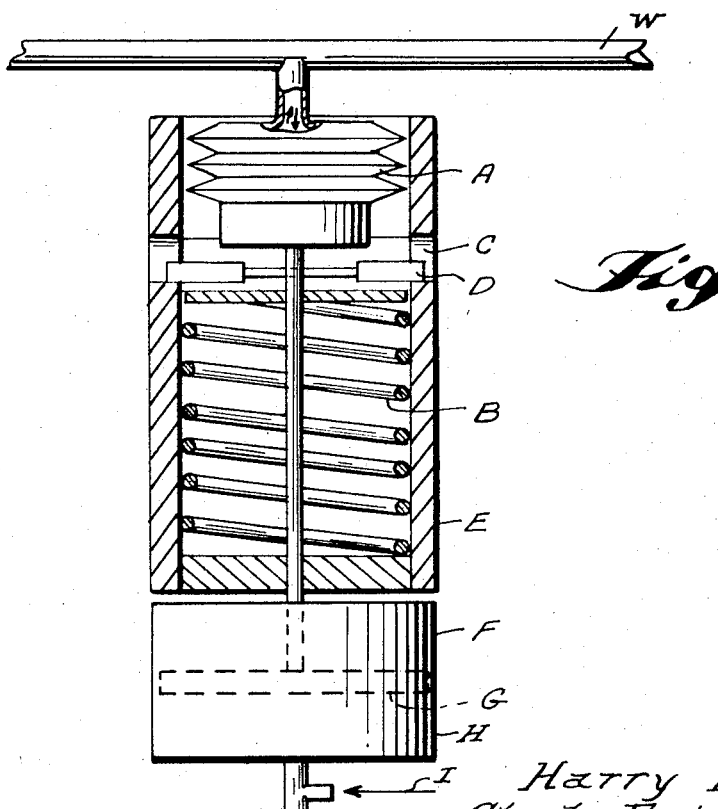
INVENTORS
Harry Edwards
Charles Frederick Kenyon
BY Cushman, Darby & Cushman
ATTORNEYS 3,431,081
APPARATUS FOR METERING AND MIXING POLYURETHANE COMPONENTS
Harry Edwards and Charles Frederick Kenyon, Manchester, England, assignors to Imperial Chemical Industries Limited, London, England, a corporation of Great Britain
Filed Nov. 1, 1963, Ser. No. 320,633
Claims priority, application Great Britain, Nov. 23, 1962, 44,355/62
U.S. Cl. 23—285    8 Claims
Int. Cl. B01f 3/08

ABSTRACT OF THE DISCLOSURE

An apparatus for the generation of polyurethane products is disclosed. The apparatus includes conventional polyurethane component metering and mixing units, and a flexible container surge compressor is used on at least one of the conduits connecting a metering unit to the mixing unit. The flexible container surge compressor is subjected to a permanent load and also has pneumatic means for imposing an additional load, with the pneumatic means controlled in a manner that the additional load is placed on the flexible container surge compressor immediately upon cessation of metering and mixing. The use of the disclosed apparatus allows the production of polyurethane products, such as foams, of more uniform quality.

---

This invention relates to a process for the manufacture of polyurethane products.

Polyurethane products are obtained in known manner from a suitable mixture of polyurethane product-forming ingredients such as polyesters or polyethers containing hydroxyl groups and polyisocyanates together as desired with water, catalyst, and other ingredients. It is usual not to mix all the ingredients until the final stage in the generation of the polyurethane product, for example the polyester or polyether is kept separate from the polyisocyanate until the final stage. It is a well known procedure to separately meter the ingredients or suitable mixtures of compatible ingredients in a suitable metering device and to pass the ingredients or mixtures of ingredients in separate ingredient streams to a device wherein the ingredients are finally mixed together and the polyurethane product generated and ejected. A typical metering device which may be used for polyurethane product-forming ingredients is, for example, that described in British Patent specification No. 856,191 which comprises a metering pump for each of the liquid ingredients, the pumps being coupled together through drives of predeterminable ratio, and driving means for the said pumps the speed of which is controllable electrically from at least one switch mounted on the spray gun or like device to which the liquid ingredients are supplied.

Various devices have been previously described in which the mixing of the ingredients and the generation and ejection of the polyurethane product may take place. In British Patent specification No. 913,611, for example, there is described a spray gun or like device wherein the individual polyurethane product-forming ingredients are separately premixed with inert gas, then mixed together in a mixing chamber and ejected in a stream of inert gas. Other devices have been described, for example, in which the polyurethane product-forming ingredients are mixed mechanically.

When the polyurethane product-forming ingredients or mixtures of ingredients forming the ingredient stream are of approximately the same viscosity the rate of flow of the ingredient streams to the mixing and product generating device is that which has been predetermined by the metering device. When the ingredient streams being metered differ considerably in their viscosities, however, it is found that the less viscous ingredient streams are likely to surge after leaving the meter so that at the commencement of a period of polyurethane product manufacture the mixture of ingredients in the generating device is too rich in the ingredients in the less viscous ingredient stream or streams and the resulting product, for example a polyurethane foam, is of poor quality. Conversely at the end of such a period when metering of the ingredients ceases there is likely to be a surge of the more viscous ingredient stream or streams. When the polyurethane product is a foam the difference in viscosity between the foam-making ingredient streams may arise or may be further increased, for example, by the admixing of a blowing agent, for example a fluorohydrocarbon, with one of the streams.

By surge we mean a temporary increase in the proportion of an ingredient stream which reaches the generating device above that predetermined by the metering device and which is itself dependent upon the proportion of the ingredient desirable for satisfactory polyurethane product formation.

We have now found that the disadvantage described above, which results from differences in the viscosities of the ingredient streams may be largely overcome by the inclusion of a surface suppressor in the passages through which the less viscous streams pass from the metering device to the polyurethane product mixing and generating device.

It is therefore an object of the present invention to provide a device which may be used in conjunction with a metering device and a polyurethane product-generating device whereby the effects of departure from regular flow in the passage connecting the metering device and the polyurethane product-generating device, which are particularly associated with the differing viscosities of the ingredient streams may be minimised.

Thus according to the present invention we provide a process for the generation of polyurethane products whereby polyurethane product-forming ingredients are metered in at least two separate ingredient streams having differing viscosities and passed to a device wherein the ingredients are mixed and the product generated, and characterised in that at least one of the passages through which the ingredient streams are passed from the metering device includes at least one surge suppressor.

The surge suppressor may be fitted, for example, in a T-branch to the passage along which the ingredient stream flows and it may comprise a flexible container subjected to a load. Under pressure of the ingredient stream, expansion of the flexible container against the load will allow the ingredient to flow into the container and thus the surge of the ingredient stream along the passage at the commencement of metering is considerably reduced. When the metering of the ingredient streams ceases the pressure in the passages between the metering and the mixing- and -generating devices is immediately lowered but the tendency for a surge by the more viscous ingredient streams is offset by the feeding back of the less viscous streams from the flexible container of the surge suppressor into the passage as the container contracts under the load.

The load on the flexible container may be obtained by arranging for it to be precompressed by a spring, and the load may be supplied, or supplemented if necessary, by pressure from a pneumatic device connected with the flexible container. The flexible container conveniently consists of a flexible bellows. Alternatively, the flexible container may consist of a container, one wall of which comprises a rolling diaphragm, the outer side of the diaphragm being in contact with a piston precompressed by a spring. The effective volume of the container increases or decreases as the rolling diaphragm moves in or out of the container under pressure of the ingredient stream or pressure of the spring. As a further alternative the flexible container may consist of flexible bellows within an outer container one wall of which comprises a rolling diaphragm. The last arrangement is of particular use where it is found that the bellows can expand and accept surging liquid ingredient by rearrangement of the pitch of the convolutions and without any increase in length. In such a case the uptake of surge is not controlled by the spring or pneumatic device, but the defect can be overcome by enclosing the bellows in a container, one wall of which comprises of rolling diaphragm, the intervening space being filled with a fluid such as oil. Expansion of the bellows in any direction is then transmitted to the rolling diaphragm and thus to the piston with which it is in contact, so that expansion of the bellows is indirectly under control of the precompressed spring and, if fitted, the pneumatic device. It is an advantage of such an arrangement that the rolling diaphragm is protected from attack by corrosive chemicals.

Although not a condition of the present invention the flow of ingredient into the surge suppressor may optionally be controlled by a suitable valve inserted in the passage along which ingredient flows from the surge suppressor to the generating device. Hence at the commencement of metering the valve may be so restricted that, dependent upon the restriction imposed, there is a corresponding greater flow of the less viscous ingredient stream into the surge suppressor. Similarly the spring loading on the flexible container of the surge suppressor may be adjusted to allow variation of the pressure of ingredient at which the container begins to expand. Thus by variation of the valve restriction or by variation of the spring loading on the flexible container differences in viscosity of the ingredient streams and other factors may be taken into account, and in addition more than one surge suppressor may be included in each passage should this prove to be necessary.

It may be found convenient to arrange the operation of the surge suppressor so that ingredient initially entering the flexible container in overcoming surge is automatically fed back to the ingredient supply tank instead of re-entering the passage when metering ceases. This may be arranged, for example, by the suitable placing of solenoid valves operated by micro switches. Alternatively it may be arranged that by means of a solenoid valve placed near the mixing and polyurethane product-generating device the flexible container is allowed to expand to contain ingredient until a predetermined pressure of the ingredient stream in the passage is reached when the valve opens and ingredient passes to the mixing and generating device.

It is preferred that the surge suppressor is fitted to and below the passage along which a less viscous ingredient stream flows in order that any residual air in the passage does not pass into and remain within the flexible container thus impairing its action.

When the metering of the ingredients ceases and the passages connecting the metering and the mixing-and-generating devices are long, or there is a high rate of flow of the ingredient streams or conditions are otherwise such that the operating pressure in the passage is too high for the flexible container to feed back a less viscous stream into the passage quickly enough to compensate for the surge of a more viscous stream, it is advantageous to supplement or replace the pressure on the flexible container due to the spring by pressure due to a pneumatic device such as for example a piston contained in an air cylinder which is attached to the flexible container and which is activated when metering is caused to cease.

In one form of the invention, at the completion of for example a foam dispensing operation, the operating switch on the mixing-and-generating device may open electrically a solenoid valve so that compressed air is admitted to the air cylinder whereby a piston moving in the cylinder and attached to the flexible container is caused to supplement the load on the container due to the spring and hence there is more rapid feed-back of a less viscous ingredient stream into the passage. The air cylinder may then subsequently be exhausted before metering of the ingredients recommences in order to allow expansion of the flexible container against the spring load only, as a less viscous ingredient stream flows into the container at the commencement of metering. In this form of the invention therefore the surge encountered during the metering of liquid ingredient streams may be controlled at the commencement of metering by the manual presetting of the spring load on the flexible container and at the termination of metering by predetermination of the necessary air cylinder pressure, and the volume of surge absorbed may be varied by adjustment of the movement of the flexible container.

A preferred embodiment of the present invention is illustrated in the accompanying drawings wherein FIG. 1 represents the arrangement of the surge suppressor U and the optional valve V in the passage W with relation to the metering device X and the mixing and generating device Y, and FIG. 2 represents the side elevation of one embodiment of a surge suppressor according to the present invention. The surge suppressor U may be positioned at any convenient point in the passage W and the optional valve V may be positioned at any convenient point in the passage W between the surge suppressor and the mixing and generating device Y.

In FIG. 2, A represents a flexible bellows which forms a sealed surge chamber when attached to the passage W. The bellows are precompressed by an adjustable spring B and movement of the bellows is restricted by the pegs D which engage in the slots C of the outer housing E. The optional pneumatic device F comprises a piston G contained within a cylinder H and attached to the bellows and compressed air is introduced into the cylinder by way of the port I.

In FIG. 1 the optional pneumatic device O connected with the bellows of the surge suppressor U is controlled by an electrical switch T on the mixing and generating device Y (which is itself actuated by the control trigger) connected electrically by conductors R to a source of electrical energy S and to a solenoid Q (optionally operated through an electrical relay) which controls an air valve P connected with the pneumatic device O.

As a further variant of the present invention, when, for example, there are only two polyurethane product-forming ingredient streams which are of differing viscosities, it may be convenient to fit a surge suppressor to each of the passages through which the streams pass, the two surge suppressors being interconnected at their flexible containers by a device comprising a double-acting form of the pneumatic device F illustrated in FIG. 2, in which compressed air may be introduced into the cylinder H on either side of the piston. Thus, depending on the control of compressed air inlet ports and exhaust ports on each side of the piston, for example by solenoid valves, one flexible container is compressed whilst the other is expanded. Admission of compressed air, at the commencement of metering, into the cylinder on the side of the piston nearest to the surge suppressor in the passage through which the less viscous ingredient stream flows would thus assist expansion of the flexible container on this side and hence assist the flow of this ingredient stream into the container in overcoming surge. At the same time the flow of the more viscous ingredient stream from the other flexible container into the passage to which it is attached is assisted. At the end of metering compressed air may be admitted to the cylinder on the other side of the piston to assist in overcoming the surge of the more viscous ingredient stream.

The surge suppressor may be constructed of any materials which are suitable to withstand the operating conditions and the chemical action of the ingredients employed when the surge suppressor contains a bellows, the bellows may be constructed for example of convoluted metal or plastic. When the surge suppressor incorporates a rolling diaphragm, the said diaphragm is preferably composed of an elastomeric material such as natural or synthetic rubber backed by fabric.

What we claim is:

1. Apparatus for the generation of polyurethane products by the mixing of polyurethane product-forming ingredients supplied in at least two separate ingredient streams having different viscosities, which apparatus comprises a mixing and generating device for the said ingredients, separate metering devices for the said ingredient streams connected by passages to the said mixing and generating device and means for controlling the operation of the said mixing and generating and metering devices, at least one of the passages connecting a metering device to the mixing and generating device being in communication with a flexible container which is subjected to a permanent load and which is also provided with pneumatic means for imposing an additional load thereon, the pneumatic means being linked to the aforesaid control by means for bringing the pneumatic means into operation immediately upon cessation of metering and mixing.

2. Apparatus as claimed in claim 1 in which the flexible container consists of a flexible bellows.

3. Apparatus as claimed in claim 1 in which the flexible container consists of a container one wall of which comprises a rolling diaphragm.

4. Apparatus as claimed in claim 1 in which the flexible container consists of a flexible bellows within an outer container one wall of which comprises a rolling diaphragm.

5. Apparatus as claimed in claim 1 wherein the permanent load on the flexible container is imposed by a spring.

6. Apparatus as claimed in claim 1 wherein the pneumatic device comprises a piston working with an air cylinder and attached to the flexible container.

7. Apparatus as claimed in claim 1 wherein the pneumatic means are linked to the control means by way of an electrical switch on the mixing and generating device.

8. Apparatus as claimed in claim 7 wherein the electrical switch is in electrical connection with a solenoid which controls an air valve connected to the pneumatic means, whereby the electrical switch controls the pneumatic means.

References Cited

UNITED STATES PATENTS

| 1,950,107 | 3/1934 | Guinn et al. | |
| 2,894,732 | 7/1959 | Taber et al. | 23—252 |
| 2,958,516 | 11/1960 | Wall et al. | 23—252 |
| 3,230,047 | 1/1966 | Weinbrenner et al. | 23—252 |
| 3,100,506 | 8/1963 | Breer | 137—567 |

JAMES H. TAYMAN, JR., *Primary Examiner.*

U.S. Cl. X.R.

23—252, 253; 138—30; 103—223; 137—92; 260—77.5